US008160255B2

(12) United States Patent
Fluhrer (10) Patent No.: US 8,160,255 B2
(45) Date of Patent: Apr. 17, 2012

(54) SYSTEM AND METHOD FOR ENCRYPTED GROUP NETWORK COMMUNICATION WITH POINT-TO-POINT PRIVACY

(75) Inventor: Scott Fluhrer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 942 days.

(21) Appl. No.: 11/379,920

(22) Filed: Apr. 24, 2006

(65) Prior Publication Data

US 2007/0248225 A1    Oct. 25, 2007

(51) Int. Cl.
*H04L 29/06* (2006.01)

(52) U.S. Cl. ........ 380/277; 380/283; 380/278; 380/277; 380/44; 380/46; 713/171; 713/168; 713/150; 726/2; 726/3; 726/12; 726/15

(58) Field of Classification Search ........................ None
See application file for complete search history.

(56) References Cited

U.S. PATENT DOCUMENTS

| | | | | |
|---|---|---|---|---|
| 5,627,892 | A * | 5/1997 | Kauffman | 380/212 |
| 7,046,662 | B1 | 5/2006 | Saluja et al. | |
| 7,184,437 | B1 | 2/2007 | Cole et al. | |
| 7,234,063 | B1 * | 6/2007 | Baugher et al. | 713/189 |
| 7,298,839 | B2 | 11/2007 | Eisentraeger et al. | |
| 7,308,706 | B2 * | 12/2007 | Markham et al. | 726/4 |
| 7,366,894 | B1 | 4/2008 | Kalimuthu et al. | |
| 7,447,901 | B1 | 11/2008 | Sullenberger et al. | |
| 7,486,795 | B2 * | 2/2009 | Eschenauer et al. | 380/277 |
| 7,536,715 | B2 * | 5/2009 | Markham | 726/11 |
| 7,558,877 | B1 | 7/2009 | Fedyk et al. | |
| 7,594,262 | B2 * | 9/2009 | Hanzlik et al. | 726/15 |
| 7,596,690 | B2 * | 9/2009 | Singh | 713/151 |
| 7,602,737 | B2 | 10/2009 | Asati et al. | |
| 7,657,036 | B2 * | 2/2010 | Hsu et al. | 380/281 |
| 7,720,995 | B2 * | 5/2010 | Wainner et al. | 709/242 |
| 7,801,030 | B1 | 9/2010 | Aggarwal et al. | |
| 7,840,810 | B2 * | 11/2010 | Eastham | 713/171 |
| 7,848,335 | B1 * | 12/2010 | Kang et al. | 370/401 |
| 7,957,320 | B2 * | 6/2011 | Konig et al. | 370/254 |
| 7,962,743 | B2 * | 6/2011 | Fluhrer | 713/153 |
| 2003/0126265 | A1 | 7/2003 | Aziz et al. | |

(Continued)

OTHER PUBLICATIONS

*Configuring Dynamic Multipoint VPN Spoke Router in Full Mesh IPsec VPN Using Security Device Manager.* White Paper, Cisco System, Inc., (2004), 26 pgs.

(Continued)

*Primary Examiner* — Syed A. Zia (74) *Attorney, Agent, or Firm* — Schwegman, Lundberg & Woessner, P.A.

(57) ABSTRACT

Various embodiments of the disclosed subject matter provide methods and systems for improved efficiency and security in secure gateway-to-secure gateway network communication. Embodiments provide systems and methods for generating a sender secure gateway private identity, obtaining a receiver secure gateway public identity, generating an encryption key using the sender secure gateway private identity and the receiver secure gateway public identity, encrypting a data packet using the encryption key, and sending the encrypted data packet to a receiver secure gateway. Embodiments also provide systems and methods for generating a receiver secure gateway private identity, obtaining a sender secure gateway public identity, generating a decryption key using the receiver secure gateway private identity and the sender secure gateway public identity, receiving an encrypted data packet from a sender secure gateway, and decrypting the data packet using the decryption key.

25 Claims, 6 Drawing Sheets

U.S. PATENT DOCUMENTS

| | | | |
|---|---|---|---|
| 2003/0191937 A1 | 10/2003 | Balissat et al. | |
| 2003/0211842 A1* | 11/2003 | Kempf et al. | 455/411 |
| 2004/0103283 A1* | 5/2004 | Hornak | 713/175 |
| 2005/0114663 A1* | 5/2005 | Cornell et al. | 713/168 |
| 2006/0253556 A1* | 11/2006 | Wallis et al. | 709/220 |
| 2006/0253703 A1* | 11/2006 | Eronen et al. | 713/156 |
| 2007/0016663 A1 | 1/2007 | Weis | |
| 2007/0271451 A1 | 11/2007 | Fluhrer | |
| 2008/0320303 A1 | 12/2008 | Khalid et al. | |
| 2009/0097417 A1 | 4/2009 | Asati et al. | |
| 2009/0157901 A1 | 6/2009 | Asati et al. | |
| 2009/0304004 A1 | 12/2009 | Huynh et al. | |
| 2010/0223458 A1* | 9/2010 | McGrew et al. | 713/153 |
| 2011/0013641 A1* | 1/2011 | Kolhi et al. | 370/401 |

OTHER PUBLICATIONS

Menezes, A., et al., "Diffie-Hellman Key Exchange", *In: Handbook of Applied Cryptography*, CRC Press LLC, (1997), 4 pgs.

Dynamic Multipoint VPN (DMVPN) Design Guide, [online]. Cisco Systems, Inc., San Jose, CA, [retrieved on Sep. 7, 2009]. Retrieved from the internet: <URL: http://web.archive.org/web/*/www.cisco.com/> >, (2006), 101 pgs.

Frey, G., et al., "The Tate Pairing and the Discrete Logarithm Applied to Elliptic Curve Cryptosystems", [online]. Oct. 7, 1998. [retrieved on Sep. 29, 2010]. Retrieved from the Internet: <URL: www-rcf.usc.edu/~mdhuang/cs599/frey98tate.pdf>, 5 pgs.

Luciani, J., et al., "NBMA Next Hop Resolution Protocol (NHRP)", Network Working Group, Request for Comments: 2332, (Apr. 1998), 53 pgs.

Rekhter, Y., et al., "", A Border Gateway Protocol 4 (BGP-4), RFC 4271, [retrieved Mar. 2010], IETF, <http://tools.ietf.org/html/rfc4271>, (Jan. 2006), 105 pgs.

\* cited by examiner

SYSTEM AND METHOD FOR ENCRYPTED GROUP NETWORK COMMUNICATION WITH POINT-TO-POINT PRIVACY

TECHNICAL FIELD

The disclosed subject matter relates to the field of computer network communications, and more particularly to methods and systems providing encrypted group network communication with point-to-point privacy.

CROSS-RELATED APPLICATIONS

This patent application is related to U.S. patent application Ser. No. 11/419583, entitled, "SYSTEM AND METHOD FOR PROTECTED SPOKE TO SPOKE COMMUNICATION USING AN UNPROTECTED COMPUTER NETWORK", filed on 05/22/2006, and assigned to Cisco Technology, Inc.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006 Cisco Systems, Inc. All Rights Reserved.

BACKGROUND

A Virtual Private Network (VPN) is a logical network that uses insecure public telecommunications, such as the Internet, to provide secure communications to members of the VPN. A VPN seeks to provide the security associated with dedicated communication lines but without requiring the necessary hardware and at a fraction of the cost, which is typically associated with dedicated communication lines.

A VPN works by using shared public infrastructure while simultaneously maintaining privacy through agreed upon security procedures and protocols. Essentially, a VPN uses custom encryption to encrypt messages communicated via the VPN. The encryption and decryption of messages rely upon keys that are securely held by participants of the VPN.

Dynamic Group VPN (DGVPN) is an enhancement of the virtual private network configuration process of conventional network routers. DGVPN prevents the need for pre-configured (static) IPsec peers in the network. IPsec (IP security) is a standard for securing Internet Protocol (IP) communications by encrypting and/or authenticating all IP packets communicated among the network peers. IPsec provides security at the network layer. The DGVPN functionality of conventional network routers allows greater scalability over previous IPsec configurations. All traffic between protected areas is encrypted by the secure gateway as it leaves one secure area, and decrypted by another secure gateway as it enters another. This eliminates the need for a hub to route data between secure gateway networks, as was common in a non-fully meshed frame relay topology.

In DGVPN, network traffic can traverse from one secure gateway to another. In order for the various secure gateways to be able to encrypt and decrypt the traffic, there is a centralized key server that generates the IPSec keys, and distributes them to the various secure gateways. Because all secure gateways have the same keys, this eliminates the overhead of establishing individual links between pairs of secure gateways.

Unfortunately, because the key server distributes the same keys to all security gateways, data packets sent to a secure gateway group can be accessed and deciphered by any secure gateway in the group. In many circumstances, it is desirable to maintain point-to-point privacy and not allow access to data packets by all members of a group. But, it is also desirable to not be required to incur the overhead of establishing individual links between each secure gateway. Conventional VPN solutions have not been able to provide such privacy in an encrypted group network configuration.

Thus, a system and method for ensuring privacy in point-to-point encrypted group network communication is needed.

DETAILED DESCRIPTION

In the following detailed description, reference is made to the accompanying drawings that form a part hereof, and in which are shown by way of illustration, specific embodiments in which the disclosed subject matter can be practiced. It is understood that other embodiments may be utilized and structural changes may be made without departing from the scope of the disclosed subject matter. The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

As described further below, according to various example embodiments of the disclosed subject matter described herein, there is provided a system and method for ensuring privacy in point-to-point encrypted group network communication.

A DGVPN secure gateway is typically configured with one or more key server IP addresses. DGVPN key server IP addresses are typically static, such as at a corporate headquarters. The secure gateway router is configured with the key server's IP address, allowing the secure gateway to connect with the key server when online. The key server does not need to be configured with the IP addresses of the secure gateway routers. This allows many secure gateway VPN routers to be deployed without the need to configure additional peers on the hub(s). In the past, the configuration of the hub grew whenever a secure gateway VPN router was added to the IPsec network.

Security gateways can be used to protect a connected subnet from unauthorized access through an unprotected network to which the security gateway may be connected. Conventional group keying protocols can be used to dynamically create encrypted security gateway groupings, where the same encryption keys are used to encrypt the traffic independent of which security gateway is to perform the encryption or the decryption. Group keying protocols can be efficient in that it is not necessary to maintain separate point-to-point keying connections between each security gateway in the group. However, conventional group keying protocols allow any security gateway in a group to access and decipher data packets sent to any security gateway in the group. It is often undesirable to allow such group access to encrypted data packets. As will be described in more detail below, various embodiments described herein provide systems and methods to retain the benefits of secure gateway groupings without requiring the additional overhead of maintaining separate point-to-point keying connections between each secure gateway in the group.

Various embodiments described herein use a Tate pairing as a cryptographic methodology. Elliptic curves are considered useful for the implementation of common cryptographic protocols. The main advantage is that much smaller keys can be used, as there is no known polynomial-time algorithm for the discrete logarithm problem for the great majority of such curves. Tate pairing operates on a pair of points related to an elliptic curve. One important property of the Tate pairing is bilinearity. Using Tate pairing, a function can be defined that will compute an encryption key from a pair of values; the same function also being useful for computing a decryption key from a related pair of values. These methods can be used in various embodiments herein to generate an encryption/decryption key from a pair of identity values, one identity value being a public identity and the other identity value of the pair being a private identity. In the description that follows, these identities are denoted as a public identity or private identity. The public identity will be a value that is publicly available about the security gateway, such as the description of the traffic it protects. The private identity will be a value that is computed by the key server, and is shared only by the key server and the specific security gateway. It will be apparent to those of ordinary skill in the art that other equivalent cryptographic methodologies may also be employed.

Figure 1:
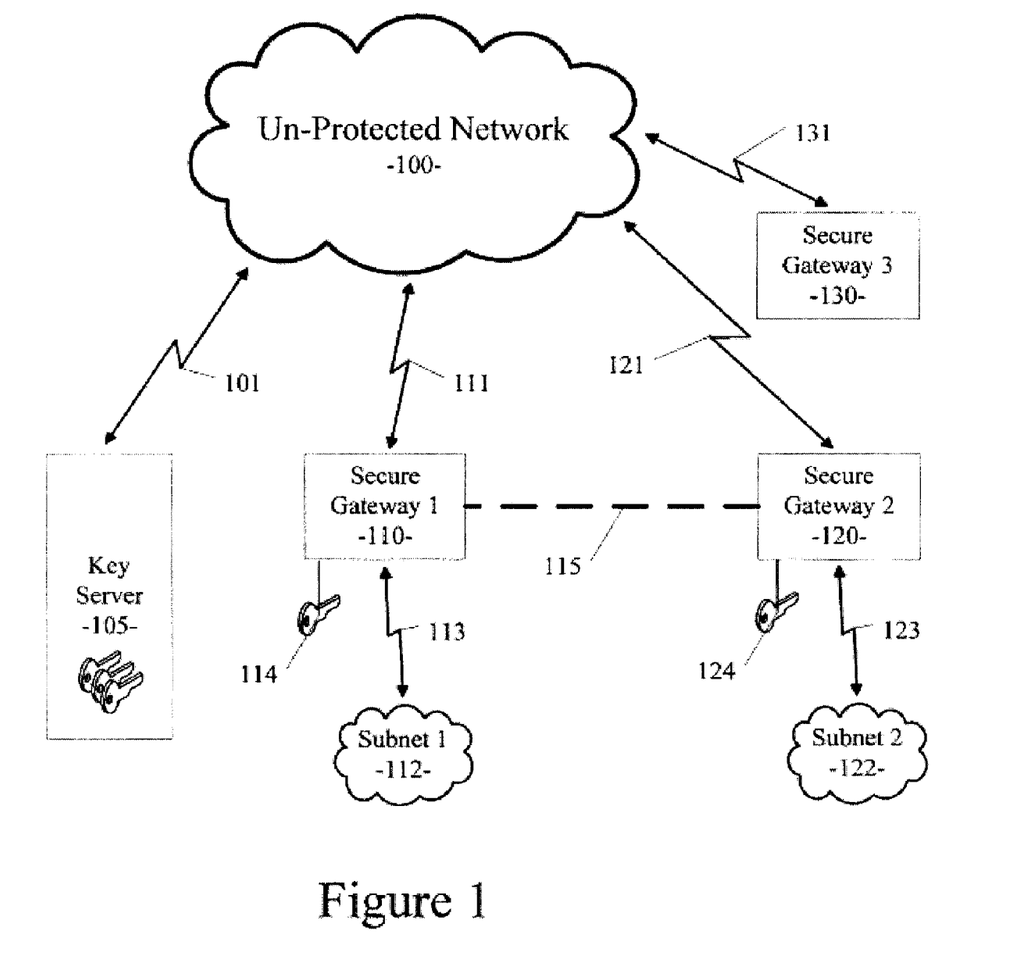
FIG. 1 illustrates the typical network environment of various embodiments.

Referring to FIG. 1, the typical network environment of various embodiments is illustrated. As shown, a key server 105 is logically connected to three example secure gateways 110, 120, and 130 through an unprotected network 100, such as the Internet. The key server 105 and secure gateways 110, 120, and 130 can be implemented as conventional network routers. Secure gateways 110 and 120 each control access to a corresponding subnet 112 and 122, respectively. It will be apparent to those of ordinary skill in the art that many other gateways (generally denoted herein as secure gateways) and subnets will be interconnected in a typical network configuration. Additionally, well-known network routing and data transfer protocols can be used to transfer data between the key server 105 and the secure gateways and between the secure gateways themselves via the network 100. In the manner described in more detail below, protected and private data communication between secure gateways can be accomplished via the unprotected network 100 using a secure gateway group keying protocol.

In an initialization phase, the key server 105 selects a security parameter for the secure gateway group. The security parameter is used, as described below, to create encryption keys for private data transfer between any two members of the secure gateway group. The selection of a particular security parameter can be accomplished using conventional cryptographic processes. As will be described below, given any public identity (e.g. a public identity of a secure gateway), key server 105 can construct the corresponding private identity (e.g. a private identity of the same secure gateway). This public identity may be an IP address, a description of the protected data traffic, and the like. In the various embodiments described herein, each secure gateway has an associated unique public identity and a corresponding private identity.

Also as part of an initialization phase, a member of the secure gateway group (e.g. a secure gateway) identifies itself to key server 105. After the key server 105 confirms that the secure gateway identifying itself to the key server 105 is authorized to protect a set of data traffic, key server 105 will send a private identity corresponding to that protected data traffic to the secure gateway.

When a secure gateway receives data traffic that the secure gateway needs to protect, the secure gateway will generate an encryption key. To generate the encryption key, the secure gateway uses the private identity of the source of the traffic, which the secure gateway has if it is authorized to protect the traffic. The secure gateway also uses the public identity of the destination secure gateway of the traffic. The secure gateway protecting the traffic uses the private identity of the source of the traffic and the public identity of the destination of the traffic to generate an encryption key. The encryption key is used to encrypt the traffic to be protected. It will be apparent to those of ordinary skill in the art that the generated encryption key can also be used to check the integrity of the data traffic as well as encrypting the traffic.

When a secure gateway receives encrypted traffic that the secure gateway needs to decipher, the secure gateway will generate a decryption key. To generate the decryption key, the secure gateway uses the private identity of the destination of the traffic, which the secure gateway has if it is authorized to protect the traffic. The secure gateway also uses the public identity of the source secure gateway of the traffic. The secure gateway deciphering the traffic uses the private identity of the destination of the traffic and the public identity of the source of the traffic to generate a decryption key. The decryption key is used to decrypt and validate the traffic to be deciphered. It will be apparent to those of ordinary skill in the art that the generated decryption key can also be used to check the integrity of the data traffic as well as decrypting the traffic.

In accordance with the various embodiments described herein, each secure gateway 110, 120, and 130 of a secure gateway group initially registers itself with key server 105. When a secure gateway registers with the key server 105, the secure gateway registers its group member (GM) public identity with key server 105. In addition, each registering secure gateway provides proof of its identity using a digital certificate or the like. The proof of identity ensures that a group member cannot register under the identity of a different group member. For example, when secure gateway 110 registers with key server 105, secure gateway 110 provides its own public identity and proof of identity to the key server 105. The key server 105 can compute a private identity for the registering GM using the public identity of the GM and the initially-selected security parameter for the secure gateway group. Using a conventional cryptographic function (denoted F1), the key server 105 computes a private identity for the registering GM using the public identity of the GM and the initially-selected security parameter for the secure gateway group. The key server 105 then transmits the private identity to the registering GM in a secure manner.

Referring again to FIG. 1, when a secure gateway needs to forward traffic to another secure gateway, the sender (i.e. source) secure gateway first checks to determine if the sender secure gateway has already computed an encryption key for the receiver (i.e. destination) secure gateway. A previously computed encryption key indicates a link to the receiver secure gateway has already been established as represented in FIG. 1 as dashed line 115 from sender secure gateway 110 to receiver secure gateway 120. It will be apparent to those of ordinary skill in the art that data transfer between a sender secure gateway and a receiver secure gateway occurs via unprotected network 100. If there is no previously computed encryption key, the sender secure gateway computes an encryption key for the traffic. To accomplish this, the sender secure gateway 110 uses a conventional cryptographic function (denoted F2) to combine its own GM private identity with the GM public identity of the receiver secure gateway 120 to form encryption keys. Next, the sender secure gateway 110 uses that set of encryption keys to encrypt the data traffic and sends the encrypted data packet to the receiver secure gateway 120 via the link 115.

When the receiver secure gateway 120 receives an encrypted data packet for which the receiver secure gateway 120 has not created a decryption key for the sender secure gateway 110, the receiver secure gateway computes a decryption key for the received traffic. To accomplish this, the receiver secure gateway 120 uses a conventional cryptographic function (denoted F2) to combine its own GM private identity with the GM public identity of the sender secure gateway 110 to form decryption keys. Next, the receiver secure gateway 120 uses that set of decryption keys to decrypt the data traffic received via link 115 from the sender secure gateway 110. The receiver secure gateway 120 can then use the decrypted data packet. Because the encryption keys and the decryption keys are computed from the same related identity pairs, the decryption keys can be used to produce a valid decryption of the data encrypted with the encryption keys created by the sender secure gateway 110. The receiver secure gateway 120 can then decrypt the data packet sent from the sender secure gateway 110 via the link 115.

The embodiments described herein provide an advantage over conventional DGVPN and group keying protocols in that other security gateways are unable to intercept and decipher the encrypted data packets. No other members of a secure gateway group can decipher the data. In the example described above, secure gateway 130 is not able to intercept and decipher the encrypted data packets sent between secure gateway 110 and 120. Thus, unlike conventional group keying protocols, the embodiments described herein provide an improved level of network security. Further, the embodiments described herein provide the additional advantage over other methods that provide point-to-point privacy in that a secure gateway can discard a dynamically created point-to-point link at any time without even notifying other secure gateways. This feature of the various embodiments also improves network efficiency and speed. If necessary, the point-to-point link can be dynamically re-created without introducing significant network latency.

Figure 2:
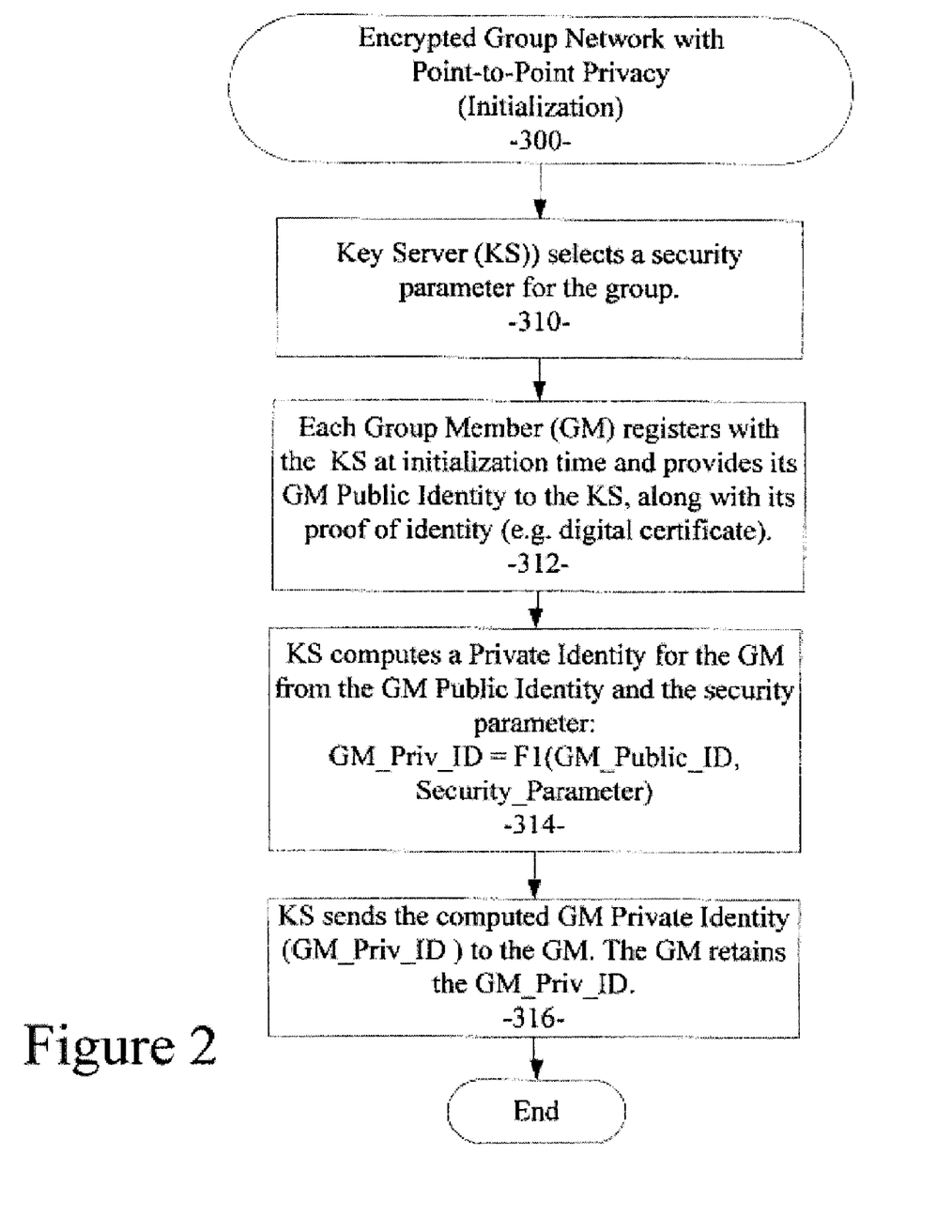
FIGS. 2-4 are processing flow diagrams that illustrate the processing flow in accordance with one example embodiment of the disclosed subject matter.
Figure 3:
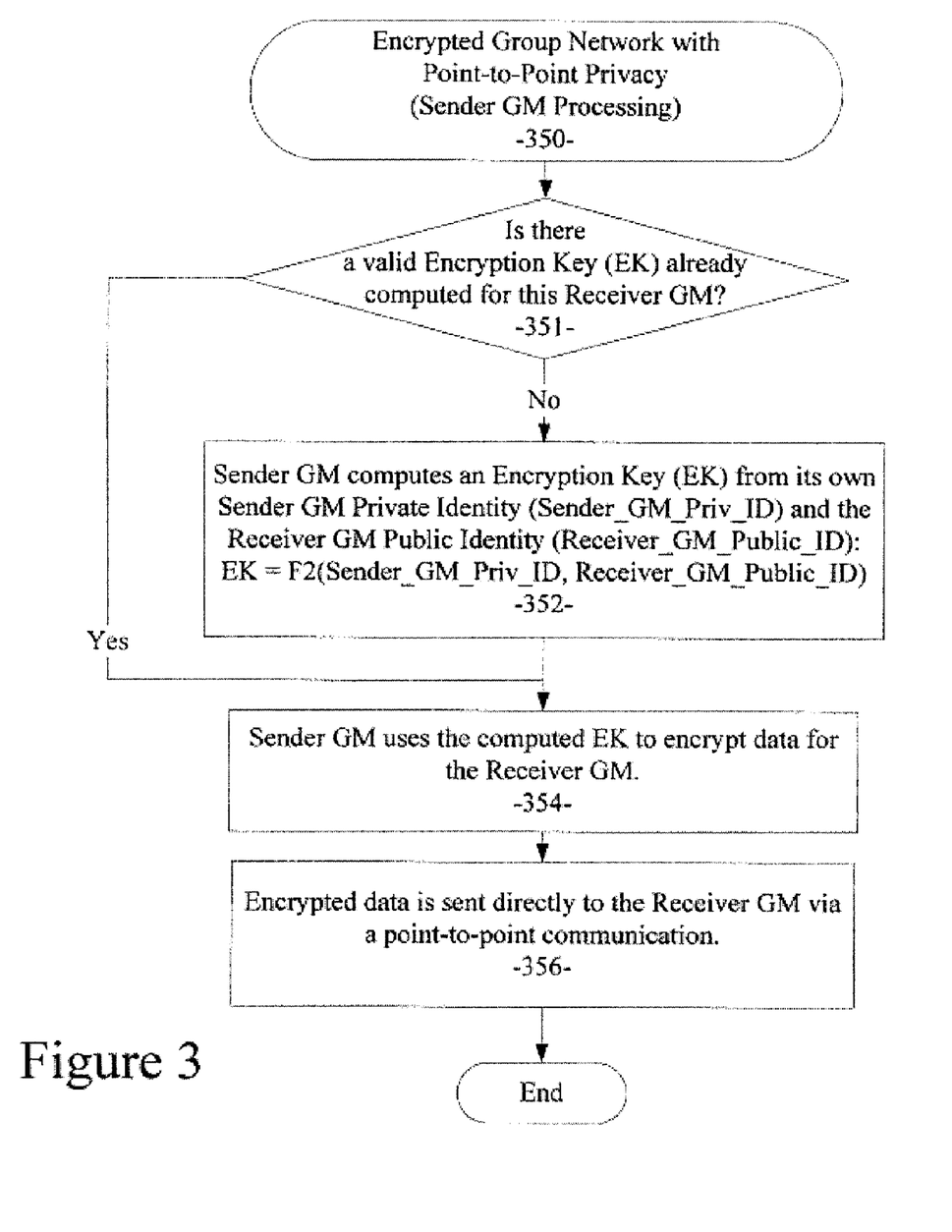
Figure 4:
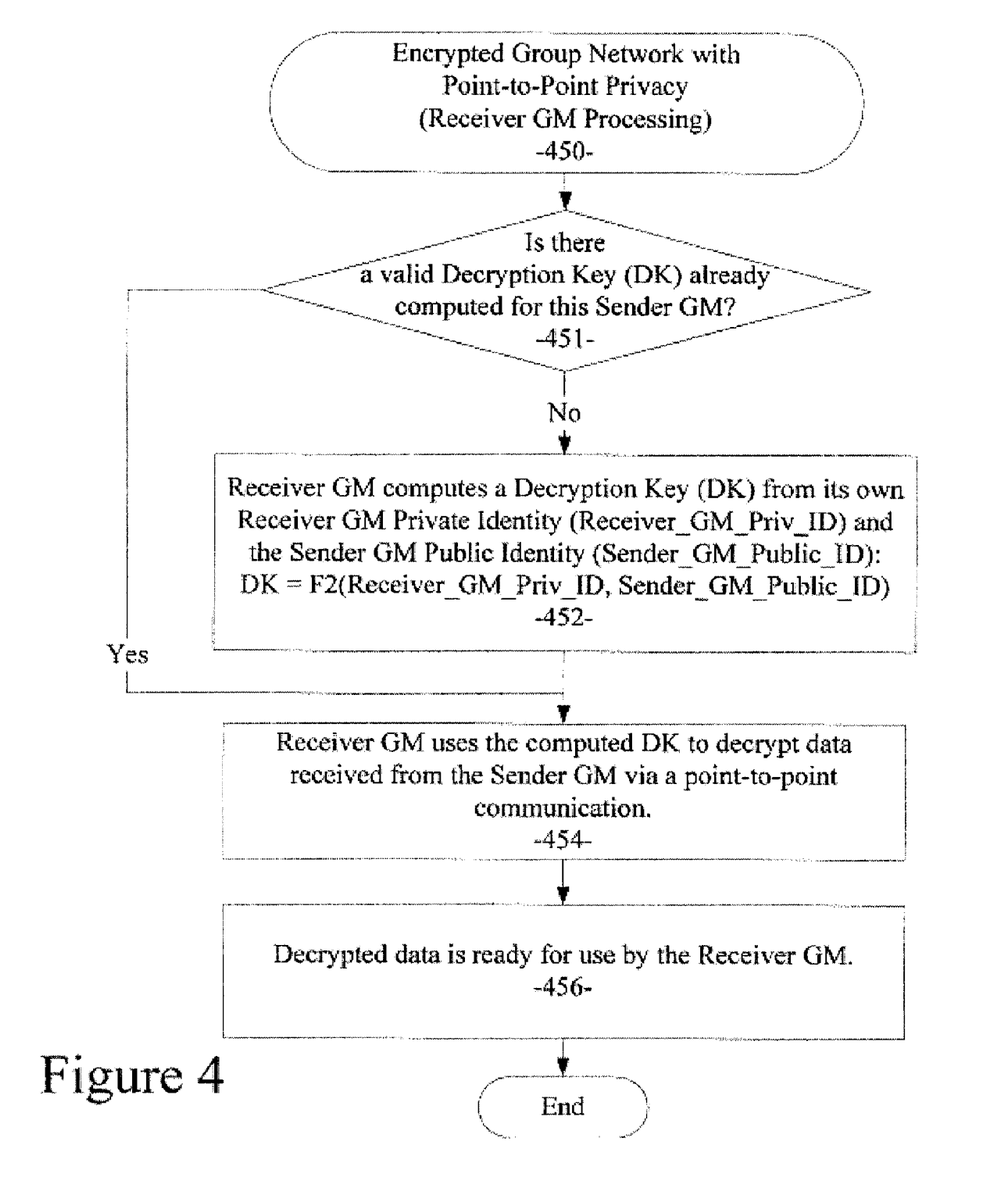

Referring now to FIGS. 2-4, flow diagrams illustrate the processing logic used in a sample embodiment. FIG. 2 shows a sequence of initialization tasks performed to set up the key server 105 and to register the group members (e.g. secure gateways). In processing block 310, the key server 105 selects a security parameter for the secure gateway group. The security parameter is used to create the private identities for the various security gateways, which are in turn used to create the encryption keys for private data transfer between two members of the secure gateway group. The selection of a particular security parameter can be accomplished using conventional cryptographic processes. In processing block 312, each Group Member (GM) registers with the key server 105. Each GM registers with the key server 105 at initialization time and provides its GM Public Identity to the key server 105, along with proof of the GM's identity (e.g. GM digital certificate). In processing block 314, the key server 105 computes a Private Identity for the registering GM from the GM Public Identity and the previously selected security parameter according to the following equation:

$$GM\_Priv\_ID = F1(GM\_Public\_ID, Security\_Parameter)$$

Using a cryptographic function (denoted F1), the key server 105 computes a private identity for the registering GM using the public identity of the GM (GM_Public_ID) and the initially-selected security parameter for the secure gateway group. In processing block 316, the key server 105 sends the computed GM private identity (GM_Priv_ID) to the registering GM in a secure manner. The GM retains the GM_Priv_ID for generation of encryption/decryption keys as described below. Initialization according to one embodiment then terminates at the end bubble illustrated in FIG. 2.

Referring to FIG. 3, processing logic for a sender group member (e.g. secure gateway) in one embodiment is illustrated. In decision block 351, the sender secure gateway determines if the sender secure gateway has already computed an encryption key for the receiver (i.e. destination) secure gateway. A previously computed encryption key indicates a link to the receiver secure gateway has already been established as represented in FIG. 1 as dashed line 115 from sender secure gateway 110 to receiver secure gateway 120. If the sender secure gateway has already computed an encryption key for the receiver (i.e. destination) secure gateway, it will not be necessary for the sender secure gateway to create a new encryption key. In this case, processing control passes from decision block 351 on the "Yes" path to processing block 354, which is described in more detail below.

In decision block 351, if the sender secure gateway determines that an encryption key for the receiver (i.e. destination) secure gateway has not been generated, processing control passes from decision block 351 on the "No" path to processing block 352. In this case, it will be necessary for the sender secure gateway to create an encryption key for this receiver GM. In processing block 352, the sender secure gateway computes an encryption key (EK) from the sender secure gateway private identity and the receiver secure gateway public identity. Using a cryptographic function (denoted F2), the encryption key (EK) for the sender secure gateway is generated by the sender secure gateway as provided in the following equation:

$$EK = F2(Sender\_GM\_Private\_ID, Receiver\_GM\_Public\_ID)$$

In processing block 354, the sender secure gateway uses the computed encryption key (EK) to encrypt data for the receiver secure gateway. The encrypted data can then be sent directly from the sender secure gateway to the receiver secure gateway via the link 115 in processing block 356. Because only the sender secure gateway and the receiver secure gateway (and the key server) are privy to the public and private identities of the sender secure gateway and the receiver secure gateway, only the sender secure gateway and the receiver secure gateway (and the key server) can access and decipher the encrypted data sent via the link 115. Processing for the sender secure gateway then terminates at the end bubble illustrated in FIG. 3.

Referring to FIG. 4, processing logic for a receiver group member (e.g. secure gateway) in one embodiment is illustrated. In decision block 451, the receiver secure gateway determines if the receiver secure gateway has already computed a decryption key for the sender (i.e. source) secure gateway. A previously computed decryption key indicates a link to the sender secure gateway has already been established as represented in FIG. 1 as dashed line 115 from sender secure gateway 110 to receiver secure gateway 120. If the receiver secure gateway has already computed a decryption key for the sender (i.e. source) secure gateway, it will not be necessary for the receiver secure gateway to create a new decryption key. In this case, processing control passes from decision block 451 on the "Yes" path to processing block 454, which is described in more detail below.

In decision block 451, if the receiver secure gateway determines that a decryption key for the sender secure gateway has not been generated, processing control passes from decision block 451 on the "No" path to processing block 452. In this case, it will be necessary for the receiver secure gateway to create a decryption key for this sender GM. In processing block 452, the receiver secure gateway computes a decryption key (DK) from the receiver secure gateway private identity and the sender secure gateway public identity. Using a cryptographic function (denoted F2), the decryption key (DK) for the receiver secure gateway is generated by the receiver secure gateway as provided in the following equation:

$$DK=F2(Receiver\_GM\_Private\_ID, Sender\_GM\_Public\_ID)$$

In processing block 454, the receiver secure gateway uses the computed decryption key (DK) to decrypt data received from the sender secure gateway via the link 115. The decrypted data can then be used by the receiver secure gateway in processing block 456. Because only the sender secure gateway and the receiver secure gateway (and the key server) are privy to the public and private identities of the sender secure gateway and the receiver secure gateway, only the sender secure gateway and the receiver secure gateway (and the key server) can access and decipher the encrypted data sent via the link 115. Processing for the receiver secure gateway then terminates at the end bubble illustrated in FIG. 4.

Figure 5:
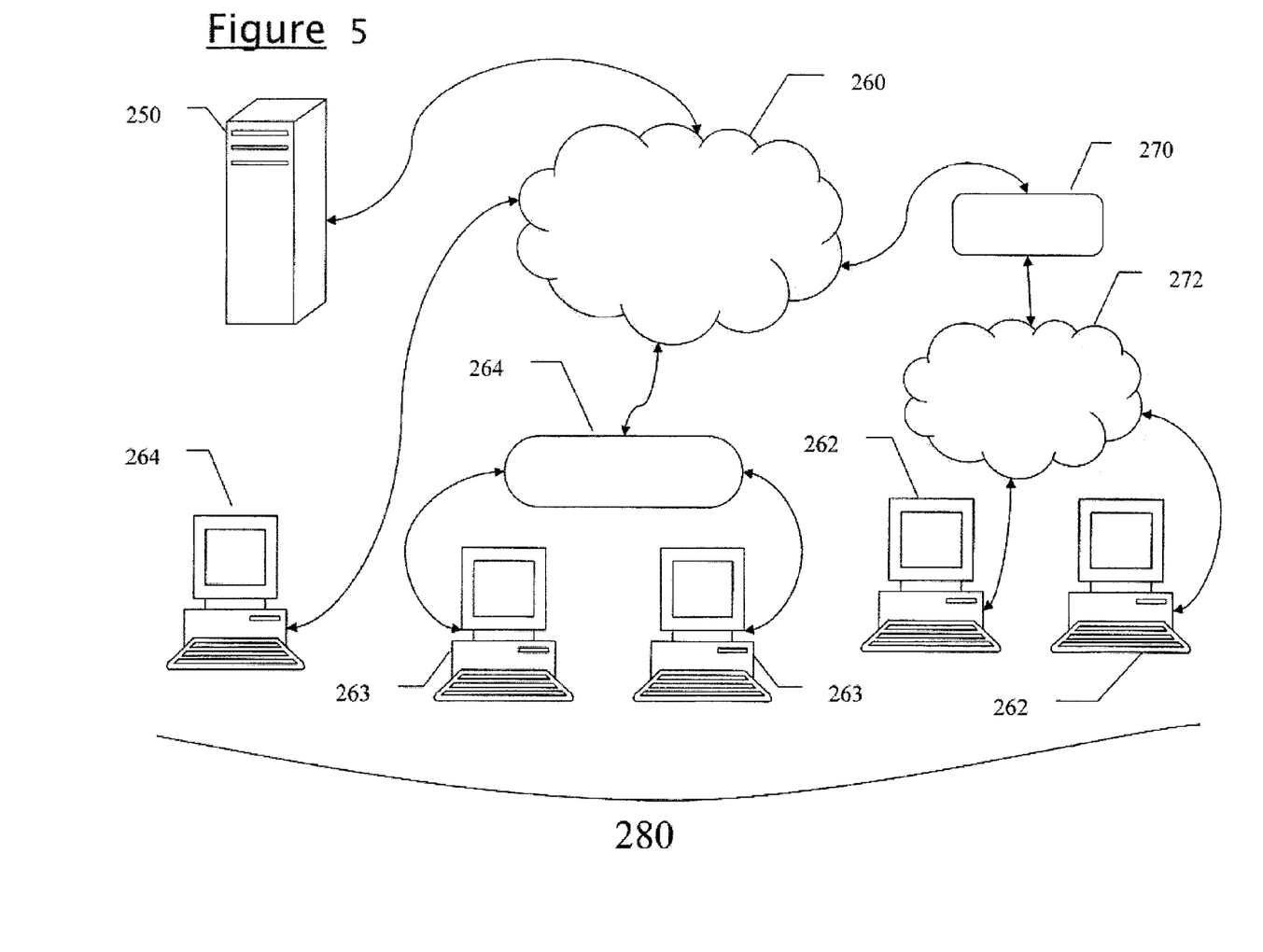
FIG. 5 illustrates a network environment in which an example embodiment may operate.

Referring now to FIG. 5, a diagram illustrates the network environment in which an example embodiment may operate. In this conventional network architecture, a server computer system 250 is coupled to a wide-area network 260. Wide-area network 260 includes the Internet, or other proprietary networks, which are well known to those of ordinary skill in the art. Wide-area network 260 may include conventional network backbones, long-haul telephone lines, Internet service providers, various levels of network routers, and other conventional means for routing data between computers. Using conventional network protocols, server 250 may communicate through wide-area network 260 to a plurality of client computer systems 262, 263, and 264 connected through wide-area network 260 in various ways. For example, client 264 is connected directly to wide-area network 260 through direct or dial-up telephone or other network transmission line. Alternatively, clients 263 may be connected through wide-area network 260 using a modem pool 264. A conventional modem pool 264 allows a plurality of client systems to connect with a smaller set of modems in modem pool 264 for connection through wide-area network 260. In another alternative network topology, wide-area network 260 is connected to a gateway computer 270. Gateway computer 270 is used to route data to clients 262 through a subnet and local area network (LAN) 272. In this manner, clients 262 can communicate with each other through local area network 272 or with server 250 through gateway 270 and wide-area network 260.

Using one of a variety of network connection means, server computer 250 can communicate with client computers 280 using conventional means. In a particular implementation of this network configuration, a server computer 250 may operate as a web server if the Internet's World-Wide Web (WWW) is used for wide area network 260. Using the HTTP protocol and the HTML coding language across wide-area network 260, web server 250 may communicate across the World-Wide Web with clients 280. In this configuration, clients 280 use a client application program known as a web browser such as the Internet Explorer™ published by Microsoft Corporation of Redmond, Wash., the user interface of America On-Line™, or the web browser or HTML renderer of any other supplier. Using such conventional browsers and the World-Wide Web, clients 280 may access image, graphical, and textual data provided by web server 250 or they may run Web application software. Conventional means exist by which clients 280 may supply information to web server 250 through the World Wide Web 260 and the web server 250 may return processed data to clients 280.

Figure 6A:
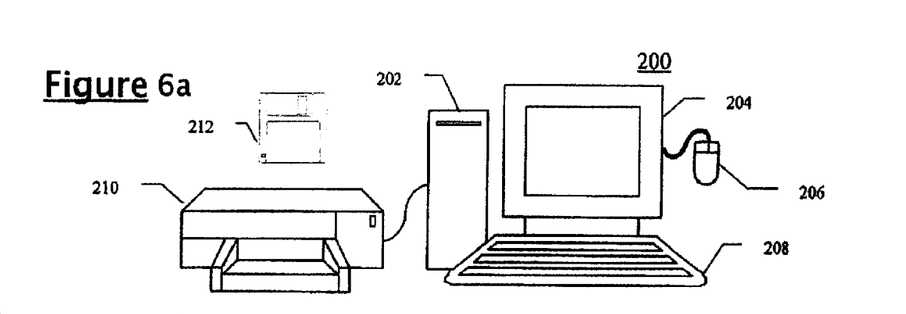
FIGS. 6a and 6b show an exemplary computer system in which the features of an example embodiment may be implemented.
Figure 6B:
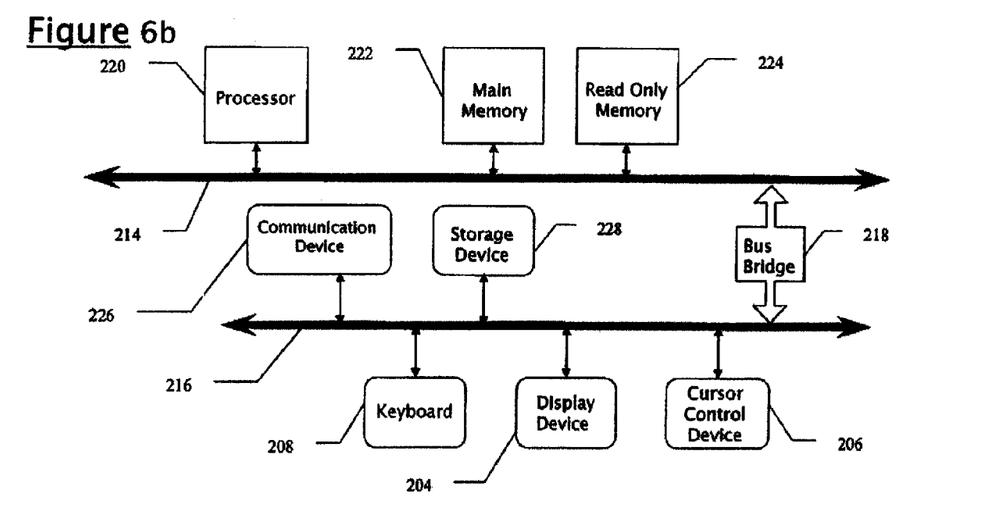

Having briefly described one embodiment of the network environment in which an example embodiment may operate, FIGS. 6a and 6b show an example of a computer system 200 illustrating an exemplary client 280 or server 250 computer system, in which the features of an example embodiment may be implemented. Computer system 200 is comprised of a bus or other communications means 214 and 216 for communicating information, and a processing means such as processor 220 coupled with bus or other communications means 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display device 204.

Alternatively, the client 280 can be implemented as a network computer or thin client device. Client 280 may also be a laptop or palm-top computing device, such as the Palm Pilot™. Client 280 could also be implemented in a robust cellular telephone, where such devices are currently being used with Internet micro-browsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers, such as web server 250, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 250 via a conventional network infrastructure such as the infrastructure illustrated in FIG. 5 and described above.

The system of an example embodiment includes software, information processing hardware, and various processing steps, which are described above. The features and process steps of example embodiments may be embodied in machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described. In particular, the use of embodiments with various types and formats of data structures may be described. It will be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

The software and/or data described herein may further be transmitted or received over a network 260 via the communication device 226 utilizing any one of a number of well-known transfer protocols, for example, the hyper text transfer protocol (HTTP). While the machine-readable medium 212 is shown in an example embodiment to be a single medium, the term "machine-readable medium" as an article of manufacture should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding, or carrying a set of instructions for execution by the machine and that cause the machine to perform any one or more of the methodologies of the disclosed subject matter, or that is capable of storing, encoding, or carrying data structures utilized by or associated with such a set of instructions. The term "machine-readable medium" shall accordingly be taken to include, but not be limited to, solid-state memories, optical and magnetic media.

Although the present specification describes components and functions implemented in the embodiments with reference to particular standards and protocols, the disclosed subject matter may be not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Thus, as described above, a system and method for ensuring privacy in point-to-point encrypted group network communication is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

I claim:

1. A computer-implemented method comprising:
providing a secure gateway group including a plurality of members of the secure gateway group that share common security data;
generating, by use of a processor, a different private identity for each of the plurality of members of the secure gateway group, and sending the private identity for each of the plurality of members of the secure gateway group to the corresponding member;
obtaining a sender secure private identity corresponding to a source of network traffic;
obtaining a receiver secure public identity corresponding to a destination of the network traffic, the destination being a particular member of the secure gateway group;
using a processor to generate an encryption key using the sender secure private identity and the receiver secure public identity in a Tate pairing, wherein the encryption key being generated using the Tate pairing based on an elliptic curve;
encrypting a data packet of the network traffic using the encryption key; and
sending the encrypted data packet to the destination of the network traffic within the secure gateway group in a secure point-to-point network communication, members of the secure gateway group other than the destination of the network traffic being unable to decrypt the encrypted data packet.

2. The method as claimed in claim 1 including registering a sender secure gateway with a key server.

3. The method as claimed in claim 1 wherein a key server maintains a security parameter for the secure gateway group.

4. A computer-implemented method comprising:
providing a secure gateway group including a plurality of members of the secure gateway group that share common security data;
generating, by use of a processor, a different private identity for each of the plurality of members of the secure gateway group, and sending the private identity for each of the plurality of members of the secure gateway group to the corresponding member;
obtaining a receiver secure private identity corresponding to a destination of network traffic, the destination being a particular member of the secure gateway group;
obtaining a sender secure public identity corresponding to a source of the network traffic;
using a processor to generate a decryption key using the receiver secure private identity and the sender secure public identity in a Tate pairing, wherein the decryption key being generated using the Tate pairing based on an elliptic curve;

receiving an encrypted data packet of the network traffic at the destination within the secure gateway group in a secure point-to-point network communication from the source of the network traffic, members of the secure gateway group other than the destination of the network traffic being unable to decrypt the encrypted data packet; and decrypting the data packet at the destination within the secure gateway group using the decryption key.

5. The method as claimed in claim 4 including registering a receiver secure gateway with a key server.

6. The method as claimed in claim 4 wherein a key server maintains a security parameter for the secure gateway group.

7. An apparatus comprising:
   means for providing a secure gateway group including a plurality of members of the secure gateway group that share common security data;
   means for generating, by use of a processor, a different private identity for each of the plurality of members of the secure gateway group, and sending the private identity for each of the plurality of members of the secure gateway group to the corresponding member;
   means for obtaining a sender secure private identity corresponding to a source of network traffic;
   means for obtaining a receiver secure public identity corresponding to a destination of the network traffic, the destination being a particular member of the secure gateway group;
   means for using a processor to generate an encryption key using the sender secure private identity and the receiver secure public identity in a Tate pairing, wherein the encryption key being generated using the Tate pairing based on an elliptic curve;
   means for encrypting a data packet of the network traffic using the encryption key; and
   means for sending the encrypted data packet to the destination of the network traffic within the secure gateway group in a secure point-to-point network communication, members of the secure gateway group other than the destination of the network traffic being unable to decrypt the encrypted data packet.

8. The apparatus as claimed in claim 7 including means for registering a sender secure gateway with a key server.

9. The apparatus as claimed in claim 7 wherein a key server maintains a security parameter for the secure gateway group.

10. An apparatus comprising:
    means for providing a secure gateway group including a plurality of members of the secure gateway group that share common security data;
    means for generating, by use of a processor, a different private identity for each of the plurality of members of the secure gateway group, and sending the private identity for each of the plurality of members of the secure gateway group to the corresponding member;
    means for obtaining a receiver secure private identity corresponding to a destination of network traffic, the destination being a particular member of the secure gateway group;
    means for obtaining a sender secure public identity corresponding to a source of the network traffic;
    means for using a processor to generate a decryption key using the receiver secure private identity and the sender secure public identity in a Tate pairing, wherein the decryption key being generated using the Tate pairing based on an elliptic curve;
    means for receiving an encrypted data packet of the network traffic at the destination within the secure gateway group in a secure point-to-point network communication from the source of the network traffic, members of the secure gateway group other than the destination of the network traffic being unable to decrypt the encrypted data packet; and
    means for decrypting the data packet at the destination within the secure gateway group using the decryption key.

11. The apparatus as claimed in claim 10 including means for registering a receiver secure gateway with a key server.

12. The apparatus as claimed in claim 10 wherein a key server maintains a security parameter for the secure gateway group.

13. An apparatus comprising:
    a sender secure gateway being one of a plurality of members of a secure gateway group that share common security data, the sender secure gateway being a source of network traffic, the sender secure gateway being operable to obtain a sender secure gateway private identity from a key server, the key server having generated a different private identity for each of the plurality of members of the secure gateway group and having sent the private identity for each of the plurality of members of the secure gateway group to the corresponding member, the sender secure gateway being configured to obtain a receiver secure gateway public identity corresponding to a destination of the network traffic, the destination being a particular member of the secure gateway group, the sender secure gateway being configured to generate an encryption key using the sender secure gateway private identity and the receiver secure gateway public identity in a Tate pairing, wherein the encryption key being generated using the Tate pairing based on an elliptic curve, the sender secure gateway being configured to encrypt a data packet of the network traffic using the encryption key; and the sender secure gateway being configured to send the encrypted data packet to the destination of the network traffic within the secure gateway group in a secure point-to-point network communication, members of the secure gateway group other than the destination of the network traffic being unable to decrypt the encrypted data packet.

14. The apparatus as claimed in claim 13 wherein the sender secure gateway is further operable to register with the key server.

15. The apparatus as claimed in claim 13 wherein the key server is further operable to maintain a security parameter for the secure gateway group.

16. An apparatus comprising:
    a receiver secure gateway being one of a plurality of members of a secure gateway group that share common security data, the receiver secure gateway being a destination of network traffic, the receiver secure gateway being operable to obtain a receiver secure gateway private identity from a key server, the key server having generated a different private identity for each of the plurality of members of the secure gateway group and having sent the private identity for each of the plurality of members of the secure gateway group to the corresponding member, the receiver secure gateway being configured to obtain a sender secure gateway public identity corresponding to a source of the network traffic, the source being a particular member of the secure gateway group, the receiver secure gateway being configured to generate a decryption key using the receiver secure gateway private identity and the sender secure gateway public identity in a Tate pairing, wherein the decryption key being generated using the Tate pairing based on an elliptic curve, the receiver secure gateway being configured to receive an encrypted data packet from the source of the network traffic in a secure point-to-point network communication; and the receiver secure gateway being configured to decrypt the data packet using the decryption key, members of the secure gateway group other than the destination of the network traffic being unable to decrypt the encrypted data packet.

17. The apparatus as claimed in claim 16 wherein the receiver secure gateway is further operable to register with the key server.

18. The apparatus as claimed in claim 16 wherein the key server is further operable to maintain a security parameter for the secure gateway group.

19. An article of manufacture comprising at least one non-transitory machine readable storage medium having one or more computer programs stored thereon and operable on one or more computing systems to: generate a different private identity for each of a plurality of members of a secure gateway group and to send the private identity for each of the plurality of members of the secure gateway group to the corresponding member; obtain a sender secure gateway private identity corresponding to a source of network traffic; obtain a receiver secure gateway public identity corresponding to a destination of the network traffic, the destination being a particular member of a secure gateway group that includes a plurality of members that share common security data; generate an encryption key using the sender secure gateway private identity and the receiver secure gateway public identity in a Tate pairing, wherein the encryption key being generated using the Tate pairing based on an elliptic curve; encrypt a data packet of the network traffic using the encryption key; and send the encrypted data packet to the-destination of the network traffic within the secure gateway group in a secure point-to-point network communication, members of the secure gateway group other than the destination of the network traffic being unable to decrypt the encrypted data packet.

20. The article of manufacture according to claim 19 further operable to register a sender secure gateway with a key server.

21. An article of manufacture comprising at least one non-transitory machine readable storage medium having one or more computer programs stored thereon and operable on one or more computing systems to: generate a different private identity for each of a plurality of members of a secure gateway group and to send the private identity for each of the plurality of members of the secure gateway group to the corresponding member; obtain a receiver secure gateway private identity corresponding to a destination of network traffic, the destination being a particular member of a secure gateway group including a plurality of members that share common security data; obtain a sender secure gateway public identity corresponding to a source of the network traffic; generate a decryption key using the receiver secure gateway private identity and the sender secure gateway public identity in a Tate pairing, wherein the decryption key being generated using the Tate pairing based on an elliptic curve; receive an encrypted data packet of the network traffic at the destination within the secure gateway group in a secure point-to-point network communication from the source of the network traffic, members of the secure gateway group other than the destination of the network traffic being unable to decrypt the encrypted data packet; and decrypt the data packet at the destination within the secure gateway group using the decryption key.

22. The article of manufacture according to claim 21 further operable to register a receiver secure gateway with a key server.

23. A system comprising:
a key server to generate a different private identity for each of a plurality of members of a secure gateway group that shares common security data, the key server to send the private identity for each of the plurality of members of the secure gateway group to the corresponding member; and
a plurality of members of the secure gateway group that shares common security data, the plurality of members being in data communication with the key server via a network, the plurality of members of the secure gateway group being operable to: obtain a sender secure gateway private identity corresponding to a source of network traffic; obtain a receiver secure gateway public identity corresponding to a destination of the network traffic, the destination being a particular member of the secure gateway group; generate an encryption key using the sender secure gateway private identity and the receiver secure gateway public identity in a Tate pairing, wherein the encryption key being generated using the Tate pairing based on an elliptic curve; encrypt a data packet of the network traffic using the encryption key; and send the encrypted data packet to the destination of the network traffic within the secure gateway group in a secure point-to-point network communication, members of the secure gateway group other than the destination of the network traffic being unable to decrypt the encrypted data packet.

24. The system according to claim 23 wherein each secure gateway is operable to register with the key server.

25. The system according to claim 23 wherein the key server is operable to maintain a security parameter for the secure gateway group.

* * * * *

UNITED STATES PATENT AND TRADEMARK OFFICE
CERTIFICATE OF CORRECTION

| | | |
|---|---|---|
| PATENT NO. | : 8,160,255 B2 | Page 1 of 1 |
| APPLICATION NO. | : 11/379920 | |
| DATED | : April 17, 2012 | |
| INVENTOR(S) | : Scott R. Fluhrer | |

It is certified that error appears in the above-identified patent and that said Letters Patent is hereby corrected as shown below:

On the Title page, in field (56), under "Other Publications", in column 2, line 2, delete "Manager." and insert -- Manager, --, therefor.

On the Title page, in field (56), under "Other Publications", in column 2, line 3, delete "System," and insert -- Systems, --, therefor.

In column 13, line 39, in Claim 19, delete "the-destination" and insert -- the destination --, therefor.

Signed and Sealed this
Thirty-first Day of July, 2012

David J. Kappos
*Director of the United States Patent and Trademark Office*